(12) United States Patent
Gillett et al.

(10) Patent No.: US 9,934,221 B2
(45) Date of Patent: Apr. 3, 2018

(54) REMOTE ACCESS CONTROL FOR STORED DATA

(71) Applicant: Amazon Technologies, Inc., Seattle, WA (US)

(72) Inventors: Kevin George Gillett, Palo Alto, CA (US); Stephen Joseph Oakley, Mountain View, CA (US); Stefan Mathias Hutchison, Fremont, CA (US); Cynthia Zhang Taylor, San Leandro, CA (US); Subha Narayanamurthi, Sunnyvale, CA (US); Scott Anthony Plant, San Jose, CA (US); Robert Andrew Alexander, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 417 days.

(21) Appl. No.: 14/500,910

(22) Filed: Sep. 29, 2014

(65) Prior Publication Data

US 2016/0092442 A1    Mar. 31, 2016

(51) Int. Cl.
*G06F 21/50* (2013.01)
*G06F 17/30* (2006.01)
*H04L 29/06* (2006.01)
*G06F 21/44* (2013.01)
*G06F 21/62* (2013.01)
*G06Q 10/10* (2012.01)

(52) U.S. Cl.
CPC ........ *G06F 17/30011* (2013.01); *G06F 21/44* (2013.01); *G06F 21/50* (2013.01); *G06F 21/6218* (2013.01); *G06Q 10/10* (2013.01); *H04L 63/0876* (2013.01); *H04L 67/42* (2013.01)

(58) Field of Classification Search
CPC ............. H04L 63/0876; G06F 21/6218; G06F 21/00–21/88
See application file for complete search history.

(56) References Cited

U.S. PATENT DOCUMENTS

| 7,895,662 | B1 * | 2/2011 | Scales | G06F 21/6218 726/1 |
| 8,613,070 | B1 * | 12/2013 | Borzycki | G06F 21/6218 726/8 |

(Continued)

FOREIGN PATENT DOCUMENTS

WO    WO 2014/152025 A2    9/2014

OTHER PUBLICATIONS

International Patent Application No. PCT/US2015/052441; Int'l Search Report and the Written Opinion; dated Nov. 27, 2015; 13 pages.

(Continued)

*Primary Examiner* — Robert Beausoliel, Jr.
*Assistant Examiner* — Nirav K Khakhar
(74) *Attorney, Agent, or Firm* — Baker & Hostetler LLP

(57) ABSTRACT

A method and apparatus for document collaboration and management are disclosed. User devices associated with a user of a document management and collaboration system are identified. Documents associated with the user are downloaded to the user devices from the document management and collaboration system. A targeted denial of access to the downloaded documents is performed.

22 Claims, 7 Drawing Sheets

(56) References Cited

U.S. PATENT DOCUMENTS

| | | | |
|---|---|---|---|
| 8,788,816 B1* | 7/2014 | Spaulding | G06F 21/10 |
| | | | 713/165 |
| 9,455,794 B2* | 9/2016 | Wu | H04J 3/1694 |
| 2004/0162876 A1* | 8/2004 | Kohavi | G06F 17/30943 |
| | | | 709/203 |
| 2006/0235887 A1* | 10/2006 | Abe | G11B 20/10 |
| 2009/0260060 A1 | 10/2009 | Smith et al. | |
| 2012/0054847 A1* | 3/2012 | Schultz | G06F 21/33 |
| | | | 726/9 |
| 2013/0091549 A1 | 4/2013 | Joyce et al. | |
| 2013/0347055 A1 | 12/2013 | Motoyama | |
| 2014/0006347 A1* | 1/2014 | Qureshi | G06F 21/10 |
| | | | 707/621 |
| 2015/0081764 A1* | 3/2015 | Zhao | H04L 67/08 |
| | | | 709/203 |

OTHER PUBLICATIONS

International Patent Application No. PCT/US2015/052441; Int'l Preliminary Report on Patentability; dated Apr. 13, 2017; 9 pages.

* cited by examiner

US 9,934,221 B2

REMOTE ACCESS CONTROL FOR STORED DATA

BACKGROUND

The use of remote computing services, such as remote document storage, has greatly increased in recent years. An organization, for example, may support its operations using both internal networks of computing resources and computing resources managed by others. Computers of the organization, for instance, may communicate with computers of other organizations to access and/or provide documents or other data while using services of another organization. In many instances, organizations configure and operate remote networks using hardware managed by other organizations, thereby reducing infrastructure costs and achieving other advantages. With such configurations of computing resources, ensuring access to the resources and the data they hold can be challenging, especially given the multitude of different computing systems. For example, computers of the organization may include personal computers, tablets, smartphones, laptops, and other devices.

Ensuring that users can share and collaborate on documents is challenging given the variety of hardware and software components of different devices. Furthermore, it is challenging to help ensure security of the shared documents and to help ensure that only authorized users are allowed to access or downloaded the shared documents.

BRIEF DESCRIPTION OF DRAWINGS

Various embodiments in accordance with the present disclosure will be described with reference to the drawings, in which.

DETAILED DESCRIPTION

Figure 1:
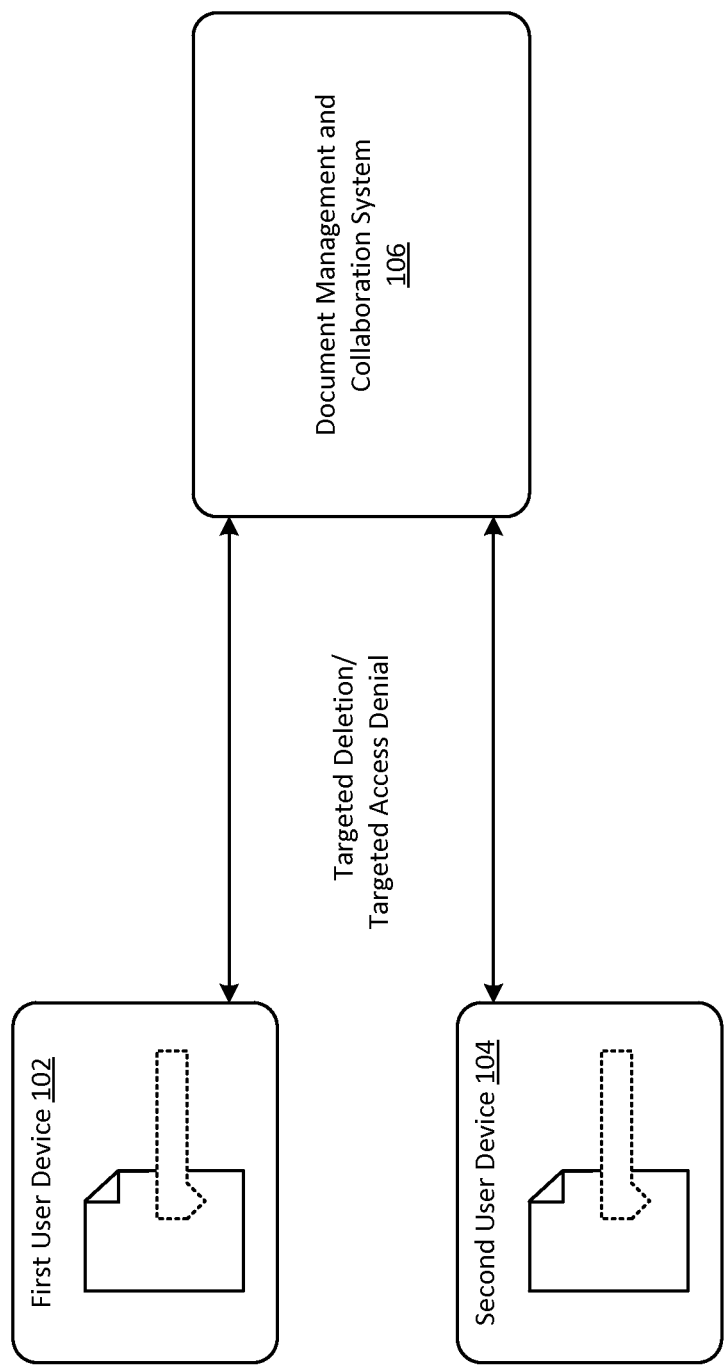
FIG. 1 shows an example of targeted document deletion in accordance with at least one embodiment.

At least some embodiments of this disclosure are generally directed to utilizing a document management and collaboration system to enable users to share documents and collaborate on the documents. The users may be part of a group of users or an organization that maintains a document directory managed by the document management and collaboration system. A user may have permission privileges to the directory or any of the directory's associated folders or subfolders. The permission privileges may permit the user to view, change, or annotate documents. The permission privileges may further permit the user to comment on or provide feedback on documents and create or delete documents or folders. There may be various levels or permissions or sharing privileges, and users' privileges may vary.

Actions performed by one user on the directory or a document may be perceived and viewed by a second user or collaborator. As described herein, each user device may be capable of communicating with the document management and collaboration system in order to take actions or make changes to a directory or document. The document management and collaboration system may, in turn, cause changes that are made by a first user to be propagated to a second user such that the second user may have a view that is consistent with the first user. It is noted that exchanges between the document management and collaboration system and users may be performed using API-configured calls.

The document management and collaboration system may utilize a variety of services to enable document sharing and collaboration. The document management and collaboration system may utilize various databases for storing document metadata, such as a document version, storage location or size, or user of group permissions for accessing documents or folders, among other types of metadata.

To improve security and integrity of the shared documents, the document management and collaboration system may allow for a targeted deletion or a target denial of access of one or more of the shared documents that have been downloaded to a device. In some embodiments, targeted deletion or targeted denial of access refers to the deletion or denial of access of a specified document or file. The targeted deletion or targeted denial of access may encompass all known copies and versions of the document or file on all known devices, on all devices that are associated with a particular user, all instances of the document or file on a particular device, one or more instances of the document or file on one or more devices, or a combination thereof. When a user authenticates into a user session of the document management and collaboration system, the user session is associated to the device. The device may be uniquely identified by device hardware or software configuration information such as host name and IP address. The device may be uniquely identified relative to other devices that are tracked by the document management and collaboration system. The document management and collaboration system may create profiles for all such devices where the user has had a user session, and maintain a list of all sessions and devices for the user.

There may be situations where it is desirable to selectively delete documents that were downloaded from the document management and collaboration system, or to deny access to documents that were downloaded from the document management and collaboration system. For example, a device may be lost or stolen, or a user may no longer be part of a collaboration group. In various embodiments, an administrator or user can selectively delete or deny access to documents at one or more levels of selection. For example, all or a set of sessions or devices associated with a user may be selected. All devices where the user has had a user session may be selected, or a specific device may be selected. Furthermore, all documents associated with a user or specific documents may be selected.

Targeted deletion or denial of access may be implemented in a number of ways. In one embodiment, an active user session may be revoked and the user is forced to login. For devices that support push notification, the document management and collaboration system may send a push notification (for example, using short message service (SMS)) to the devices. When the client running on the device receives the notification, the selected documents are deleted from the device. Upon successful deletion of the selected documents, the result may be sent back to the document management and collaboration system.

In some embodiments, the document management and collaboration system may deny access of a targeted document when a user attempts to access the targeted document. For example, in some implementations the document management and collaboration system may require that all accesses to documents are authorized for each user session. The document management and collaboration system may perform an additional security check before allowing access to a requested document to verify if a requested document is targeted for deletion.

In some embodiments, the user device may overwrite memory locations where the targeted documents are stored. This helps to ensure that the targeted document is not accessible on the user device.

Some devices that do not support push notification but may use a refresh token or access token through which time-limited access is granted, the document management and collaboration system may deny renewal of the refresh token or access token, thus not allowing continued access to the user session. The document management and collaboration system may further command the user device to delete the selected documents from the device. Upon successful deletion of the selected documents, the result may be sent back to the document management and collaboration system.

The document management and collaboration system may track and maintain state information for all pending targeted deletion or access denial requests. The document management and collaboration system may store whether the targeted deletion/access denial was requested, whether a notification was sent to the user device, and if user device has reported back. The document management and collaboration system may track periodically retry pending targeted deletion or access denial requests if no response has been received after a maximum timeout.

Deletion may include deletion of all applicable files that are on persistent disk storage on the user device along with associated metadata. Denial of access may include termination of any active session associated with the user and/or a particular user device associated with the user.

For at least some embodiments, the present disclosure describes a way to perform a targeted wipe, which can provide advantages over other systems that may implement a mobile device management system where an entire device must be reset or wiped.

FIG. 1 shows an example of document sharing and collaboration in accordance with at least one embodiment. A first user device 102 and a second user device 104 are connected to a document management and collaboration system 106. The document management and collaboration system 106 enables the user devices to share documents and collaborate on the documents. Further, the document management and collaboration system 106 enables the two user devices to be synchronized such that texts, commentaries, annotations, or highlighting that are provided by the first user device 102 may be viewed by the second user device 104. Synchronization between user devices may be performed real-time or semi-continuously, periodically or may be event-driven or event-triggered, whereby the event may be any type of user command, such as storing a document under collaboration.

The document sharing and collaboration system 106 may receive hardware and/or software configuration information for the first user device 102 and second user device 104 so that the devices can be uniquely identified and tracked. The document sharing and collaboration system 106 may receive a request to download a document (not shown) from the document management and collaboration system to the one or more computing devices. The request may originate from an administrator (not shown) or a user associated with the first user device 102 or second user device 104. The requested document is sent to the first user device 102 or second user device 104. Based on the identification of the user and the tracking of the first user device 102 or second user device 104, it may be determined that the downloaded document should be deleted from the first user device 102 or second user device 104. The document sharing and collaboration system 106 may perform a targeted deletion of the downloaded document from the first user device 102 or second user device 104. The document sharing and collaboration system 106 may further receive an indication of successful deletion of the downloaded document from the first user device 102 or second user device 104.

As described herein, the term "user" may refer to a human-operated computing device that is equipped with communication and computing capability. The term "document" may be any type of media, such as audio-visual media, that is capable of being rendered on a computing device. A document may be a computer file that is capable of being produced by or edited or viewed using a productivity program or suite. Accordingly, the document may be editable or non-editable text, images, drawings, and websites, among others. In addition to enabling users to collaborate and share documents, the document management and collaboration system 106 may provide users with file systems or organizational structures to manage the documents. The organizational structures may include directories having nested folders and subfolders of documents and may be accessible to the users and utilized by the user as a way to access documents.

Figure 2:
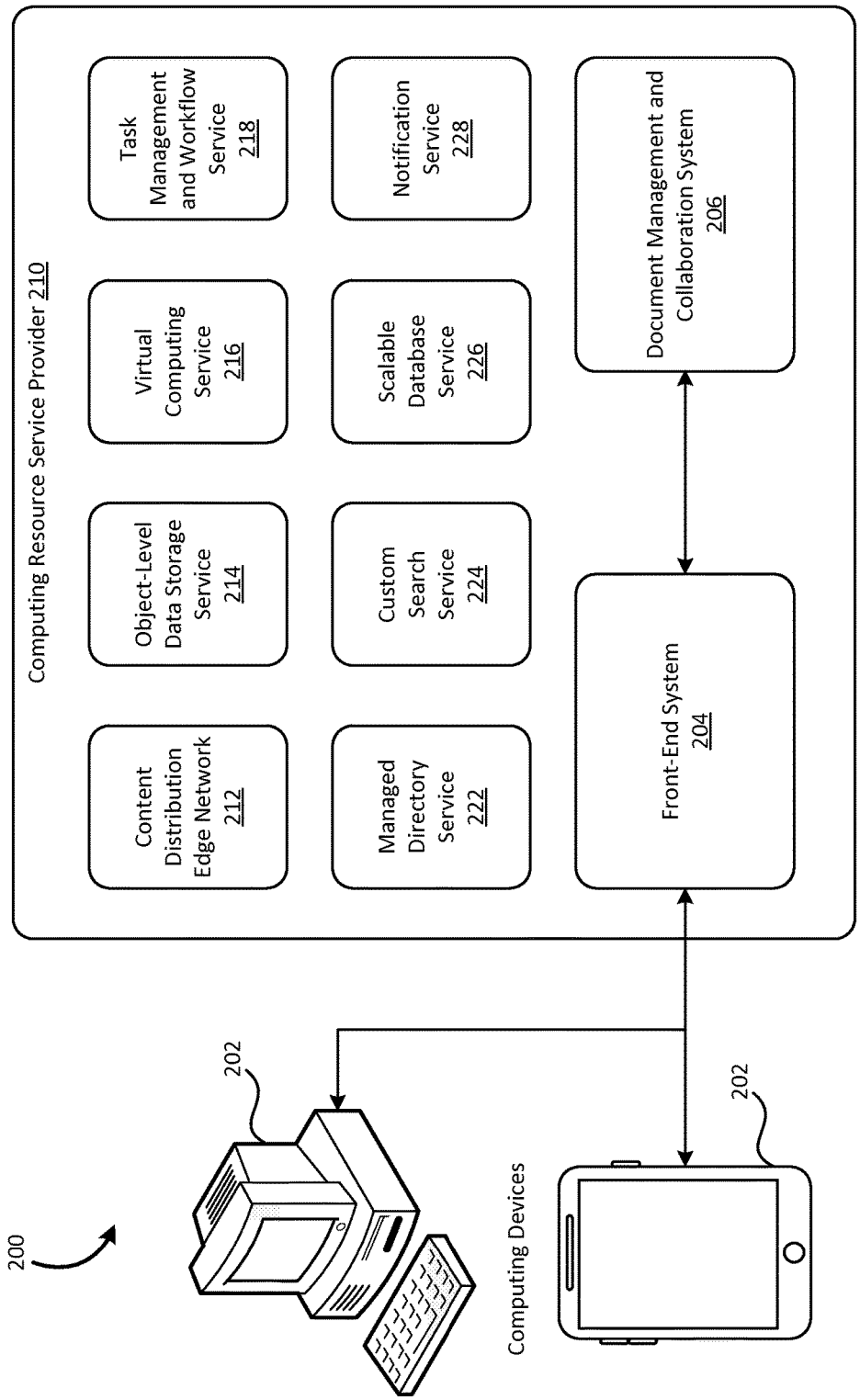
FIG. 2 shows an example of targeted document deletion in accordance with at least one embodiment.

FIG. 2 shows an example of computing devices connected to a computing resource service provider in accordance with at least one embodiment. The computing devices 202 may be any device that is capable of communicating with the computing resource service provider 210 or its entities. The computing devices 202 may also be equipped with local or remote (for example, network-based) computational and storage capabilities. The computational capabilities may be provided or enabled by a processor, such as a central processing unit (CPU), graphics processing unit (GPU), digital signal processor, and the like. Examples of CPUs include CPUs that employ an x86 architecture (for example, as used in desktop and laptop computing devices) or a reduced instruction set computing (RISC) architecture (for example, as used in smartphone and tablet computing devices). The computing devices 202 may also be equipped with communications and networking hardware and may be capable of communicating using any communications protocol. Further, the computing devices 202 may be equipped with input/output devices that may include a display, a touchscreen-based or keyboard-based input device or speakers. Additionally, the computing devices may include any type of memory, such as static or dynamic memory, and a power source or a power adapter. Aside from their hardware capability, the computing devices 202 may be configured to run or execute an operating system and/or other programs and the computing devices' 202 associated memory may store executable instructions that, when executed by one or more processor, cause one or more functions to be performed or cause the operating system and/or other programs to run. Although two devices are shown in FIG. 2, any number of devices may be contemplated in various embodiments. Further, the computing devices 202 may communicate with the computing resource service provider 210 or any entity of the computing resource service provider 210 via a network (not shown). The network may be public or private, whereby examples of the network include the Internet and an Internet service provider (ISP) network.

The computing devices 202 may collectively or individually be associated with a user or a customer of the computing resource service provider 210 or its entities and functions. The customer (not shown) may be an organization that may utilize one or more of the services provided by the computing resource service provider 210 to maintain and deliver information to its employees, which may be located in various geographical locations. Additionally, the customer may be an individual that utilizes the services of the computing resource service provider 210 to deliver content to a working group located remotely.

The computing resource service provider 210 includes a front-end system 204 and a document management and collaboration system 206 as well as a plurality of services and systems as shown in FIG. 2. These include a content distribution edge network 212, an object-level data storage service 214, a virtual computing service 216, a task management and workflow service 218, a managed directory service 222, a custom search service 224, a scalable database service 226, and a notification service 228. It is noted that in various embodiments, the computing resource service provider 210 may include fewer services and systems other than those described with reference to FIG. 2 or may include additional or alternative services or systems to those described with reference to FIG. 2. Further, in alternative embodiments, the systems and services may be utilized outside the context of the computing resources service provider 210. For example, the services and systems may be stand-alone or used in conjunction with systems and services other than those described with reference to FIG. 2.

The front-end system 204 may be a gateway to the document management and collaboration system 206 and may offer private and public services to users or customers and their computing devices 202. Access to the front-end system 204 may require authorization or user authentication. In addition, a device or user privilege level may govern access to the front-end system 204 and any data exchanges between the front-end system 204 and the computing devices 202. Access to the front-end system 204 may be governed by a privilege level associated with a computing device 202 or a privilege level or credential given to the computing device 202 or a user of the computing device 202, for example, by a group or organization administrator.

The front-end system 204 may perform authentication of a customer, a user, or a device before granting access to the resources of the document management and collaboration system 206. The authentication may be based on credentials, such as username and password information, or access tokens, among others. The front-end system 204 may provide services and interfaces that permit or enable customer access. For example, the front-end system 204 may enable a web-based platform or a console-based platform that provides information related to the services of the computing resource service provider 210 to the customer. Further, the front-end system 204 may enable the customer to execute applications or tasks in the computing resource service provider 210, track and manage the execution of the applications or tasks, receive the results of the execution, and transmit the results to user devices. As further described herein, the front-end system 204 may be the gateway by which the customer or its associated devices 202 may utilize the plurality of services provided by the computing resource service provider 210.

The document management and collaboration system 206 enables and manages the execution and processing of documents for collaboration between one or more users in a distributed system. The document management and collaboration system 206 may, for example, enable uploading documents to the computing resource service provider 210 and retaining and modifying metadata associated with the documents. The document management and collaboration system 206 may further allow for search functions associated with the documents or their metadata as well as collaborations between users on the documents.

Although the term "document" is used herein to describe objects produced or collaborated on by users of the computing resource service provider 206, the term "document" is not limited to media, such as audio-visual media. A document may be computer files that are capable of being produced by or edited or viewed using a productivity program or suite. Accordingly, the document may be editable or non-editable text, images, drawings, and websites, among others.

The content distribution edge network 212 of the computing resource service provider 210 may be a collection of computing devices and other resources collectively configured to deliver content, such as web content, to a plurality of users. The content distribution edge network 212 may have a plurality of edge locations, for example, that are distributed in world-wide locations that are strategically placed to optimize user data throughput and minimize latency. The content distribution edge network 212 may receive requests for content and deliver the requested content to users. The content distribution edge network 212 may interface with a storage service that stores a portion or all of the content and may cause the content to be retrieved and provided to a requesting party. The content distribution edge network 212 may be utilized to enable user-accessible websites or web applications of the front-end system 204.

The object-level data storage service 214 may be a collection of computing resources configured to synchronously process requests to store and/or access data. The object-level data storage service 214 may operate using computing resources (e.g., databases) that enable the object-level data storage service 214 to locate and retrieve data quickly, so as to allow data to be provided in response to requests for the data. For example, the object-level data storage service 214 may maintain stored data in a manner such that, when a request for a data object is retrieved, the data object can be provided (or streaming of the data object can be initiated) in a response to the request. As noted, data stored in the object-level data storage service 214 may be organized into data objects. The data objects may have arbitrary sizes except, perhaps, for certain constraints on size. Thus, the object-level data storage service 214 may store numerous data objects of varying sizes. As described herein, the object-level data storage service 214 may store any type of document (for example, document source files), underlays, previews, thumbnails, extracted document text, annotation indices, or truth tables.

The virtual computing service 216 may be a collection of computing resources configured to instantiate virtual machine instances on behalf of an entity of the computing resource service provider 210 (such as the document management and collaboration system 206) or on behalf of a customer. A party may interact with the virtual computing service 216 (via appropriately configured and authenticated API calls) to provision and operate virtual computer systems that are instantiated on physical computing devices hosted and operated by the virtual computing service 216. The virtual computer systems may be used for various purposes, such as to operate as servers supporting a website, to operate business applications or, generally, to serve as computing power. Further, the virtual computer systems may be used to support database applications, electronic commerce applications, business applications, and/or other applications. Although the virtual computing service 216 is shown in FIG. 2, any other computer system or computer system service may be utilized, such as a computer system or computer system service that does not employ virtualization or instantiation and instead provisions computing resources on dedicated or shared computers/servers and/or other physical devices.

The task management and workflow service 218 may be a collection of computing devices and other resources collectively configured to perform task coordination and management services that enable executing computing tasks across a plurality of computing environments and platforms. The task management and workflow service 218 tracks the progress of workflow execution and performs the dispatching and holding of tasks. Further, the task management and workflow service 218 may control the assignment of hosts or physical or virtual computing machines used for executing the tasks. A user may define a workflow for execution, whereby the workflow may include one or more tasks. The workflow may be defined using an application programming interface (API) configured function call to the task management and workflow service 218. Further, the user may specify task order for the workflow, conditional flows, and timeout periods for restarting or terminating the execution of the workflow. In addition, execution loops for the workflow may be defined. As described herein, workflow execution may by asynchronous and may be preceded by synchronous execution of database writes.

The managed directory service 222 may be a collection of computing devices and other resources collectively configured to serve as a directory that enables users to log on to computing resources of the computing resource service provider 210 using one set of credentials and to enable administrators to uniformly apply security policies to the computing resource service provider 210. The managed directory service 222 may enable a web-based console for user and group management and may be used as an authentication system for user credentials.

The custom search service 224 may be a collection of computing devices and other resources collectively configured to permit customized searches of data sets and enable establishing security or authentication requirements on a party performing a search. Further, the custom search service 224 allows for data set replication to enable consistent performance in the case of outages. As described herein, the customer search service 224 may be utilized for maintaining a search index of customer documents and their associated metadata. Further, to ensure consistent performance the searchable metadata or customer documents may be replicated to ensure consistent performance and guard against outages.

The scalable database service 226 may be a collection of computing devices and other resources collectively configured to provide a structured storage system that facilitates the storage and retrieval of documents or data. The scalable database service 226 may be non-relational and may be based on a key-value model. Examples of the scalable database service 226 include a NoSQL database (for example, to be distinguished from a relational structured query language (SQL) database). The scalable database service 226 may be used to store metadata associated with documents or users. For example, the scalable database service 226 may store metadata for underlays, overlays, documents, feedback, or comments. In addition, the scalable database service 226 may store metadata associated with users, organizations, and permissions. As a non-relational database, the scalable database service 226 may guarantee atomic writes to a single item in a single table. Accordingly, a single write may be synchronously performed to a truth table and remaining writes may be performed asynchronously using workflows.

In the environment illustrated in FIG. 2, a notification service 228 is included. The notification service 228 may comprise a collection of computing resources collectively configured to provide a web service or other interface and browser-based management console. The management console can be used to configure topics for which customers seek to notify applications (or people), subscribe clients to the topics, publish messages, or configure delivery of the messages over clients' protocol of choice (i.e., hypertext transfer protocol (HTTP), e-mail and short message service (SMS), among others). The notification service 228 may provide notifications to clients using a "push" mechanism without the need to periodically check or "poll" for new information and updates. As discussed above, the notification service 228 may send a push notification to one or more of the computing devices 202. When the client running on the device receives the notification, the selected documents may be deleted from the device. The notification service 228 may further be used for various purposes, such as monitoring applications that are being executed in the virtual computer system service 228, workflow systems, time-sensitive information updates, mobile applications, and many others.

Figure 3:
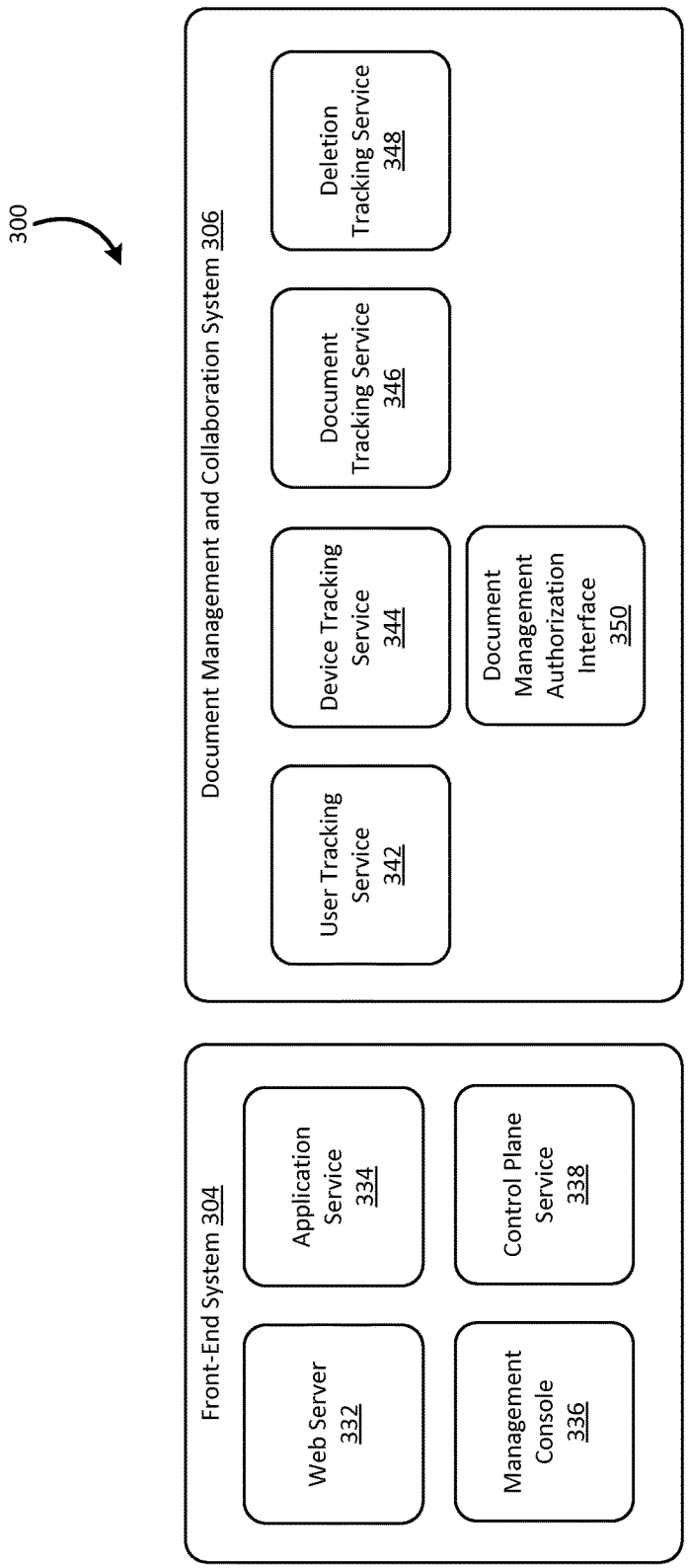
FIG. 3 shows an example of targeted document deletion in accordance with at least one embodiment.

FIG. 3 shows the functional entities of the front-end system and the document management and collaboration system in accordance with at least one embodiment. The front-end system 304 includes a web server 332, an application service 334, a management console 336, and a control plane service 338. The web server 332 may enable the execution of a website, a single-page web application, or a single-page interface that permits a user to transmit or upload documents to the document management and collaboration system 306 and manage the documents. The web server 332 may further enable the user (not shown) to view and edit documents, underlays or overlays and provide commentary or feedback on the documents. The web server 332 may also enable an administrator or a user to set permissions or share modes that specify the privileges given to a user in accessing documents. In addition, the web server may enable users or devices to submit authentication or authorization credentials. The content distribution edge network, described with reference to numeral 212 in FIG. 2, may be used to distribute content of the web server 332. The actions performed by the user may be done via a website, an application, or a management console, and the web server 332 may enable executing the website, application, or management console. Although one web server 332 is described with reference to FIG. 3, it may be contemplated that multiple web servers of any type may be used, whereby a portion of the web servers may be redundant.

The application service 334 may be a collection of computing devices and other resources collectively configured to serve as a user-exposed service that receives requests from the user and services the requests. A user request may be made using a website or a management console accessible to the user or a client that is executed on a user's device may make service requests on behalf of the user. The request may be an API function call, and the application service 334 may process the request and manage its execution. The application service 334 may cause the synchronous execution of actions associated with a received request or alternatively may cause one or more actions that require more complex processing to be queued for asynchronous execution. The application service 334 may also be responsible for receiving user credentials and request authentication of the user from an authentication service. To cause the performance of operations requested by the user, the application service 334 may make one or more function calls to services or entities of the computing resource service provider 210. For example, the application service 334 may request user or access-token validation from the managed directory service 222 or may cause search indices maintained by the custom search service 224 to be updated.

In addition to authentication, the application service 334 may also be configured to receive hardware and/or software configuration information for a user device and uniquely identify and track the user device using this information. Using the identification of the user and the tracking of the user device, a downloaded document may be deleted or otherwise made unavailable on the user device. In one embodiment, the application service 334 may cause a targeted deletion of the downloaded document from the user device.

The management console 336 may be a collection of computing devices and other resources collectively configured to permit organizations, administrators, and users to register for utilizing document management and collaboration services. The management console 336 may be used in addition or as an alternative to a website or an application running on a user device and may permit users and administrators to make service requests using appropriately configured API function calls. For example, the management console 336 may be used for inviting a user to join a document collaboration system and view and collaborate on documents. Further, the management console 336 may be used for allowing dashboard access, audit log access, permission setting (for example, for administrators and user), storage limit setting (for example, for organizations and users), and security setting (for example, password and encryption).

The control plane service 338 of the front-end system 304 may be a collection of computing devices and other resources collectively configured to serve as an interface that enables creating new computing instances for document collaboration and management. Instances may be created by transparently creating a directory in the managed directory service 222 or associating an existing directory (for example, maintained by the managed directory service 222 or by a user or administrators) for document management and collaboration. The control plane service 338 may be utilized to create a document directory, and the document directory may be executed and served by the managed directory service 222. The document directory may be associated with an organization having an administrator that is capable of providing permissions and privileges to users. Following the creation of the directory, the application service 334 may be used to enable functions affecting folders or documents of the directory.

The document management and collaboration system 306 includes a user tracking service 342, a device tracking service 344, a document tracking service 346, a deletion tracking service 348, and a document management authorization interface 350. The user tracking service 342 may be a collection of computing devices and other resources collectively configured to track users and user sessions. The device tracking service 344 may be a collection of computing devices and other resources collectively configured to track user devices.

The document tracking service 346 may be a collection of computing devices and other resources collectively configured to track various documents and which users and which documents have downloaded or accessed the documents. The deletion tracking service 348 may be a collection of computing devices and other resources collectively configured to track requests to delete documents. The document management authorization interface 350 may be a collection of computing devices and other resources collectively configured to receive and authorize requests to delete documents.

Figure 4:
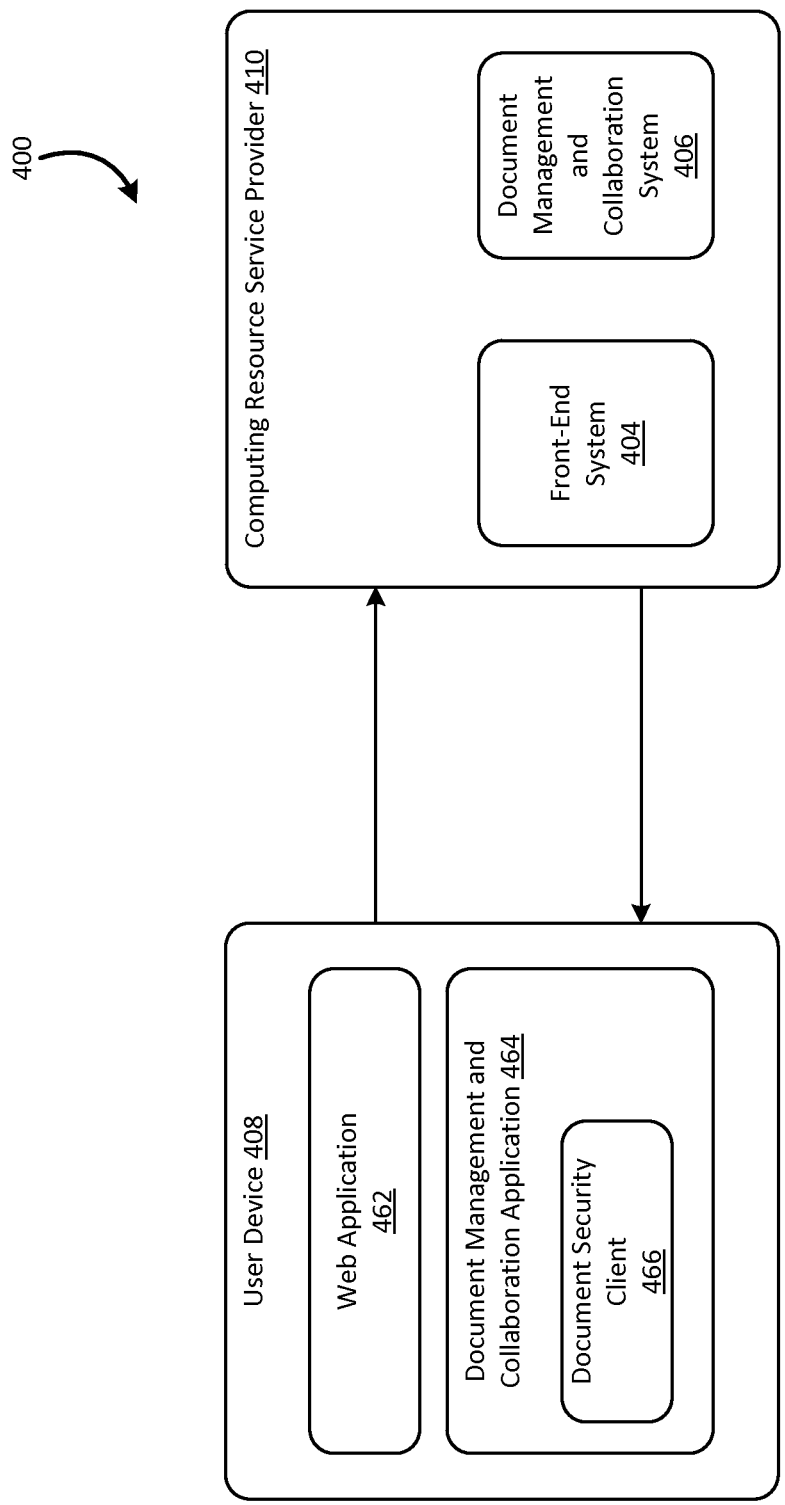
FIG. 4 shows a user device in communication with a computing resource service provider and an example of targeted document deletion in accordance with at least one embodiment in accordance with at least one embodiment.

FIG. 4 shows a user device in communication with a computing resource service provider having a document management and collaboration system in accordance with at least one embodiment. In the environment 400, the user device 408 includes a web application 462 and a document management and collaboration application 464 that is equipped with a document security client 466. The computing resource service provider 410 includes a document management and collaboration system 406, such as the document management and collaboration system described with reference to numeral 306 in FIG. 3. It is noted that the computing resource service provider 410 may include entities in addition to or in place of those shown in FIG. 4, such as the entities described with reference to FIGS. 2 and 3.

As described herein, the user device 408 may be equipped with a collection of computing devices and other resources collectively configured to communicate with the computing resource service provider 410 or any one of its entities. The user device 408 may be equipped with any number or type of communication devices, such as ports or modems that enable any type of wireless or wired connectivity. Further, the communication may be performed over any type of network (not shown), such as Internet protocol (IP) networks including the Internet, an intranet, or an Internet service provider (ISP) network. In addition, the user device 408 may communicate in accordance with or in compliance with any type of communications protocol including any one of the Institute for Electrical and Electronics Engineers (IEEE) 802 protocols, a short-range communications protocol, such as Bluetooth™, or a cellular communications protocol, such as a third generation (3G) communications protocol or long-term evolution (LTE).

The web application 462 may enable the user device 408 to render and cause the display of a website and interact with the website. An example of the web application 462 include a web browser, and the web application 462 may permit a user to supply log in credentials to a document collaboration and management website and access one or more document directories of folders. Further, the web application 462 may enable the user, for example, via a website, to navigate between folders or directories for which the user has at least viewing privileges, for example, based at least in part on the user's credentials. In addition, the website may provide the user with the option of uploading or transmitting a document to be included in a folder or to be shared, commented upon, or annotated by the user or one or more other collaborators.

Actions performed by the user in interacting with a website may cause the web application 462 to send requests to the computing resource service provider 410 or its entities. The requests may be application programming interface (API) function calls that are executed by the computing resource service provider 410. For example, when a user annotates a document version and saves the annotated version, the web application 462 may cause an API function call to be made that indicates the annotations to the computing resource service provider 410 or its entities. In some embodiments, the web application 462 may not be fully synchronous and may not cause a request to be made based on any action taken by the user. For example, as the user annotates a document, the web application 462 may not relay the annotations synchronously as they are made by the user and may instead only relay the annotations when the user saves the document or the annotations or, alternatively, every time interval.

As shown in FIG. 4, the user device 408 is further equipped with a document management and collaboration application 464. The document management and collaboration application 464 may be executable instructions (for example, that are stored on a non-transitory computer-readable storage medium on the user device 408 or coupled to the user device 408) that when executed by a computer system of the user device 408 enable user interaction with the document sharing and collaboration functionality provided by the computing resource service provider 410. As with a web application-based or a browser-based interface, the document management and collaboration application 464 enables the user to supply log in credentials and access one or more document directories or folders. The user may also interact with a document management and collaboration system 406 provided by the computing resource service provider 410 by, for example, uploading a document to one or more folders, deleting a document from one or more folders, annotating an underlay for a document, viewing an overlay including annotations, among others). The document management and collaboration application 464 may provide a mechanism for utilizing any document collaboration and management resources and functionalities that is independent of the web application 462.

The document management and collaboration application 464 includes a document security client 466 that communicates with the front-end system 404 and the document management and collaboration system 406. The document security client 466 may receive requests from document management and collaboration system 406 to delete a document. The request may include a unique document identifier. The document security client 466 may cause the identified document to be deleted from the user device 408.

Figure 5:
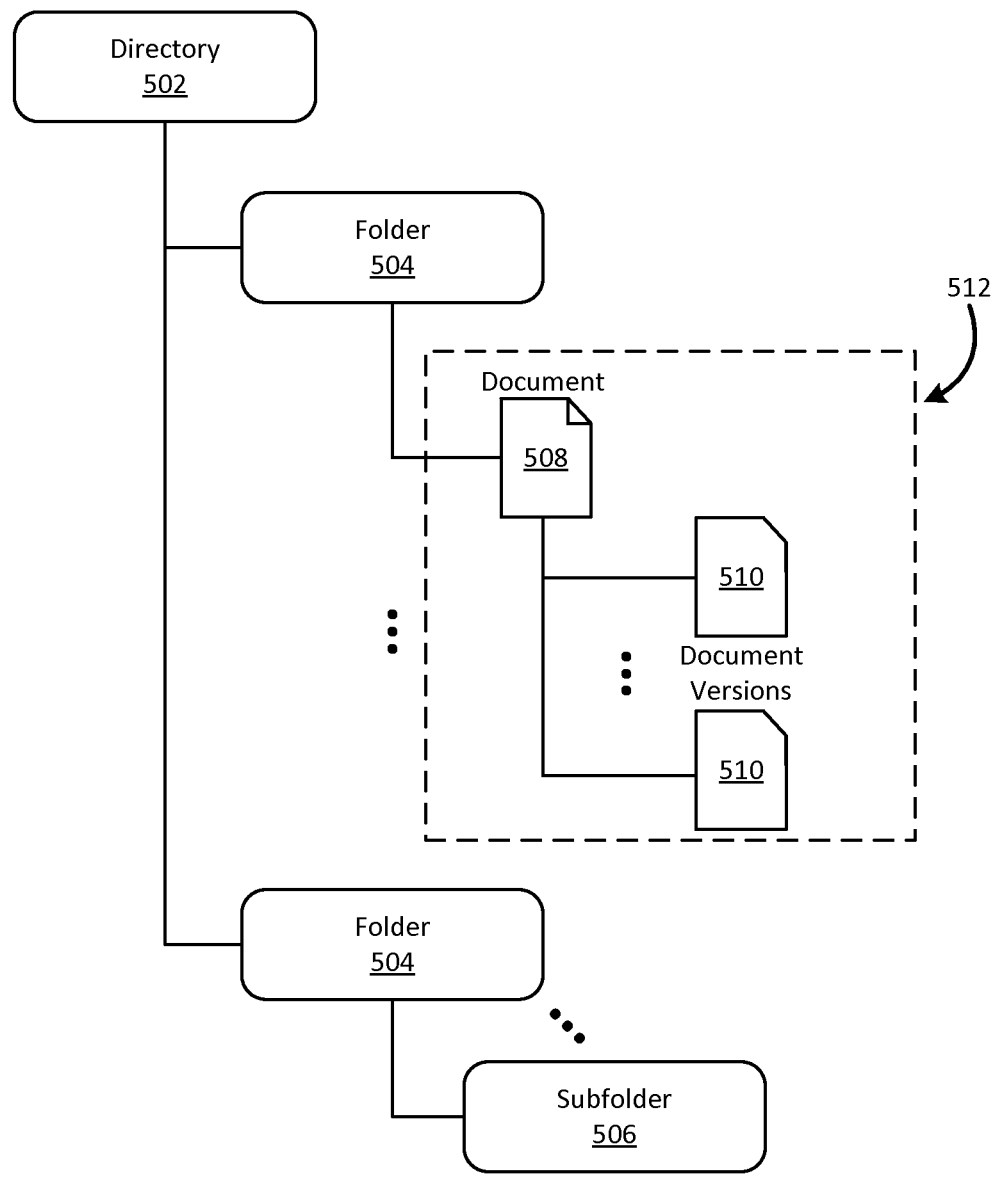
FIG. 5 shows an example of a directory structure and an example of targeted document deletion in accordance with at least one.

FIG. 5 shows an example of directory structure in accordance with at least one embodiment. A directory 502 may be maintained by a managed directory service and may be associated with an organization, which may, in turn, have one or more directories 502. As shown in FIG. 5, the directory 502 is shown to include one or more folders 504 (singularly referred to herein as folder 502). Further, a folder 504 may include one or more subfolders 506 that are nested within the folder 504. As may be recognized, a subfolder 506 may further include one or more nested subfolders. A folder 504 may be a file structure within the directory 502 and, in some embodiments, the security or permission privileges associated with the folder 504 may apply to document 508 within the folder 504 or subfolder 506 that are nested within the folder 504.

A folder 504 may retain one or more documents 508 (singularly referred to herein as document 508). As described with reference to FIG. 5, a document may include a plurality of document versions 510. A document version 510 may be one revision of a document 508 or a subsequent version or revision of an existing document including, for example, user modifications and changes. Further, the permission or security privileges provided with respect to a document may apply to the plurality of document versions 510 associated with the document 508. When document 508 is selected to be deleted, all versions including version 510 are deleted from the user device.

Figure 6:
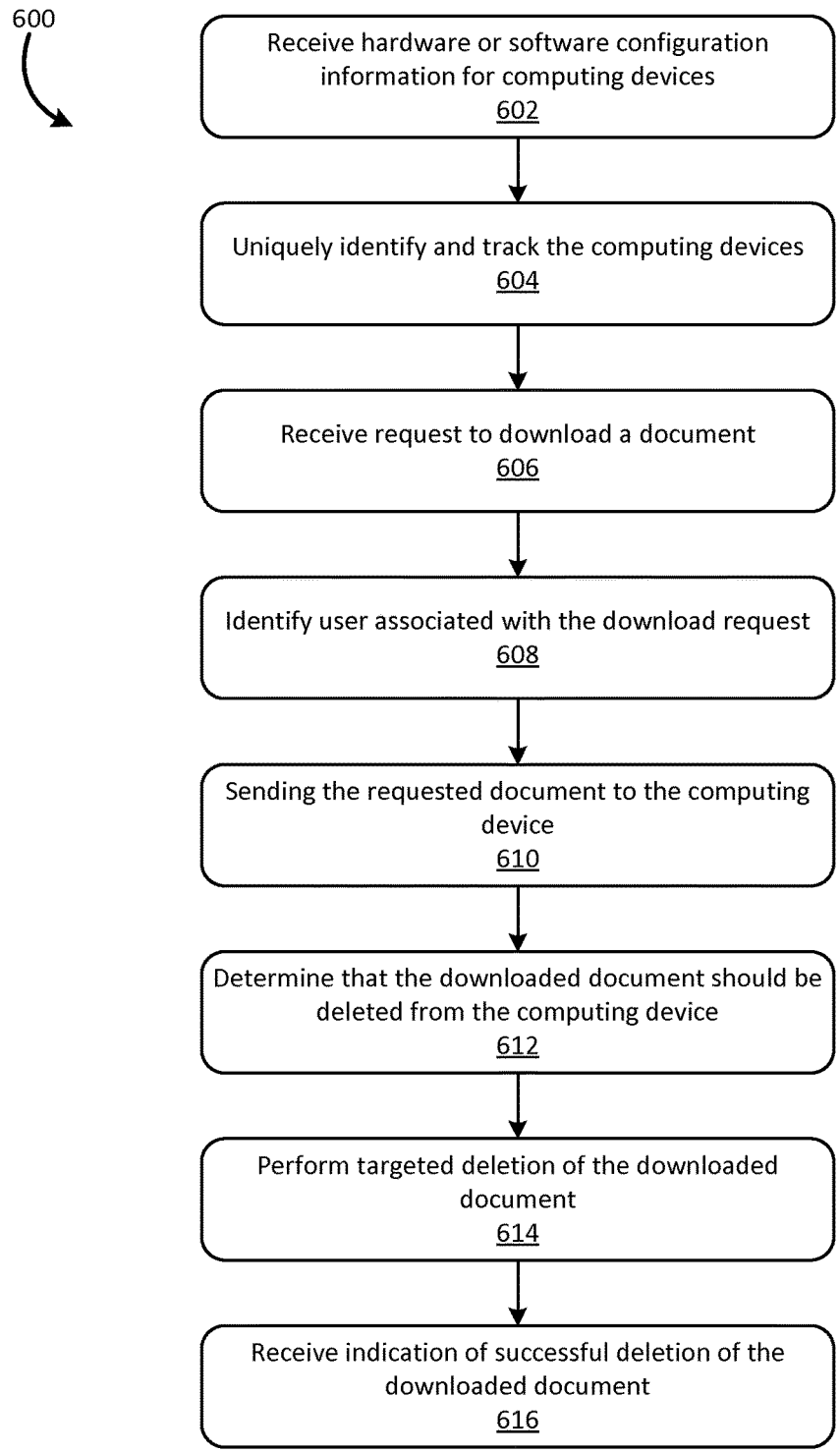
FIG. 6 shows an example of a method for shows an example of targeted document deletion in accordance with at least one embodiment.

FIG. 6 shows an example of a method for managing data in a document management and collaboration system in accordance with at least one embodiment described herein. In the process 600, an application service, such as application service 334 of FIG. 3, process 602 receives hardware and/or software configuration information for one or more computing devices. In the process 604, the one or more computing devices are uniquely identified and tracked.

In the process 606, a request is received to download a document from the document management and collaboration system to the one or more computing devices. In process 608, a user associated with the download request is identified. In process 610, the requested document is sent to the one or more computing devices.

The requested document may be a new document or a new version of an existing document. Further, the document may be a native document. The request may be received from a user and may include authentication information associated with the user, such as an access or authorization token or log-in information. The authentication information is capable of being verified to confirm an identity associated with the requestor or to confirm that the requestor is genuine or that the identity presented by the requestor is genuine. Further, it may be confirmed that the requestor is authorized or permitted to request a document to be uploaded. A user may be permitted to upload or access a document by an administrator. Further, the user may be permitted to access a document by the administrator or by another user, document owner, or other document principal. For example, the other user, document owner, or other document principal may have privileges to share a document with users and may, accordingly, utilize that privilege to enable users to access uploaded documents. As described herein, the request may be an API configured function call.

The application service then authenticates the requesting party based at least in part on the provided authentication information. The application service may utilize a directory service authorization interface for user authentication and may send the authentication information to the directory service authorization interface. The document management and collaboration system may rely on the managed directory service 222 for authentication, whereby the user's or organization's account with the managed directory service 222 may also be utilized for access to the services provided by the document management and collaboration system.

Based on the identification of the user and the tracking of the one or more computing devices, process 612 determines that the downloaded document should be deleted from the one or more computing devices.

A targeted deletion of the downloaded document from the one or more computing devices is performed in process 614. In process 616, the application service may receive an indication of successful deletion of the downloaded document.

The document management and collaboration system may be integrated with or utilized in conjunction with other services, such as a virtual desktop service that enables users to execute one or more virtual desktops using distributed computing resources. For example, the various file or document directories of the virtual desktop may be maintained by the document management and collaboration system. Using the document management and collaboration system, a user may be able to access various document directories of the user's virtual desktop or virtual operating system. The access may be performed without a need to independently access the virtual desktop or operating system or the virtual desktop service. Accordingly, when the document management and collaboration system is integrated with virtual desktop service, the directories, documents, or folders maintained by the virtual desktop service may be accessible via the document management and collaboration system.

Further, the document management and collaboration system may be utilized for storing documents and directories for the virtual desktop service. Further, in some embodiments, the document management and collaboration system may be responsible for storing desktop documents, whereas the virtual desktop service may be responsible for storing other file types, such as software applications, private e-mails, user settings, and the like. In some embodiments, security privileges may be shared between the document management and collaboration system and the virtual desktop service, whereby a user may sign on to both systems with a single sign-on and utilize a single authentication process.

Figure 7:
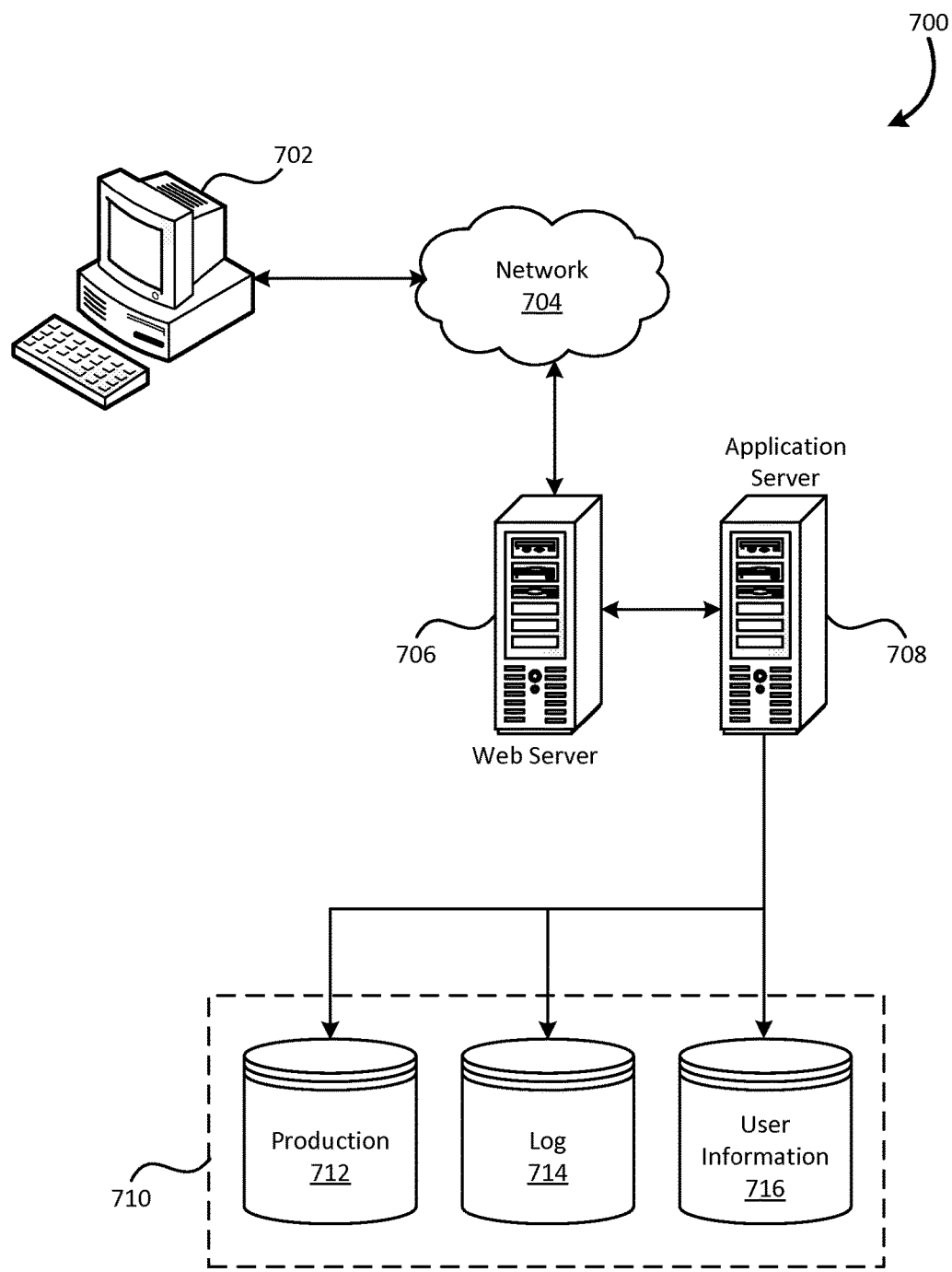
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, any other such network, and/or any combination thereof. Components used for such a system can depend at least in part upon the type of network and/or environment selected. Protocols and components for communicating via such a network are well-known and will not be discussed herein in detail. Communication over the network can be enabled by wired or wireless connections and combinations thereof. In this example, the network includes the Internet, as the environment includes a web server 706 for receiving requests and serving content in response thereto; although for other networks, an alternative device serving a similar purpose could be used, as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks, such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language (HTML), Extensible Markup Language (XML), JavaScript, Cascading Style Sheets (CSS), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the electronic client device 702 and the application server 708, can be handled by the web server using PHP: Hypertext Preprocessor (PHP), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the illustrated data store 710 may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above-listed mechanisms as appropriate or in additional mechanisms in the data store 710. The data store 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system (CMS) operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices, or processing devices, which can be used to operate any of a number of applications. User or client devices can include any of a number of general-purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes, such as development and database management. These devices also can include other electronic devices, such as dummy terminals, thin-clients, gaming systems, and other devices capable of communicating via a network. These devices also can include virtual devices, such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS) and APPLETALK. The network can be, for example, a local area network, a wide-area network, a virtual private network, the Internet, an intranet, an extranet, a public-switched telephone network, an infrared network, a wireless network, a satellite network, and any combination thereof.

In embodiments utilizing a web server, the web server can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU or processor), at least one input device (e.g., a mouse, keyboard, controller, touchscreen, or keypad), and at least one output device (e.g., a display device, printer, or speaker). Such a system may also include one or more storage devices, such as disk drives, optical storage devices, and solid-state storage devices, such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices, such as network input/output devices, may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information, such as computer-readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage or other magnetic storage devices, or any other medium that can be used to store the desired information and that can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing data in a document management and collaboration system, comprising:
under control of one or more computer systems configured with executable instructions,
receiving hardware or software configuration information for one or more computing devices;
uniquely identifying and tracking the one or more computing devices based on the hardware or software configuration information;
receiving a first request from one computing device of the one or more computing devices, wherein the first request is for a download of a document from the document management and collaboration system to the one computing device;
identifying a user associated with the first request;
sending the document to the one computing device;
based on the identification of the user and the tracking of the one or more computing devices, determining that the document should be deleted from a plurality of computing devices on which the user has had a user session;

performing a targeted deletion of the document from the plurality of computing devices; and receiving, from the plurality of computing devices, indications of successful deletion of the document.

2. The computer-implemented method of claim 1, wherein said identifying comprises authenticating the user with a user session and said tracking comprises associating the user session to the one computing device.

3. The computer-implemented method of claim 1, wherein the performing the targeted deletion comprises sending a push notification commanding the one computing device to delete the document.

4. The computer-implemented method of claim 1, wherein the performing the targeted deletion comprises denying a second request to renew a time-based use of the document by the one computing device.

5. The computer-implemented method of claim 1, further comprising maintaining status for pending deletion requests.

6. The computer-implemented method of claim 1, wherein the performing the targeted deletion comprises sending a message over an idle channel commanding the one computing device to delete the document.

7. A system, comprising:
one or more processors; and
one or more memories having stored therein instructions that, upon execution by the one or more processors, cause the one or more processors to perform operations comprising:
identifying a plurality of user devices associated with a user of a document management and collaboration system on which the user has had a user session;
determining that one or more documents associated with the user that were downloaded to the plurality of user devices from the document management and collaboration system should be deleted from the plurality of user devices;
causing a targeted deletion of the one or more documents from the plurality of user devices; and
receiving, from the plurality of user devices, indications of successful deletion of the one or more documents.

8. The system of claim 7, wherein the plurality of user devices are identified based on hardware or software configuration information for the plurality of user devices.

9. The system of claim 7, wherein the operations further comprise:
receiving a request to download one of the one or more documents to one of the plurality of user devices;
sending an indication to a synchronization client of a location for document storage; and
receiving a message from the synchronization client indicating successful storage of the one of the one or more documents at the location.

10. The system of claim 9, wherein the operations further comprise:
in response to receiving the message, causing a database to indicate that the document one of the one or more documents is downloaded or present on the one of the plurality of user devices.

11. The system of claim 7, wherein the causing the targeted deletion comprises sending push notifications to the plurality of user devices indicating that the one or more documents should be deleted from the plurality of user devices.

12. The system of claim 7, wherein the causing the targeted deletion comprises denying a request to renew a time-based use of the document on the plurality of user devices.

13. The system of claim 7, wherein the causing the targeted deletion comprises:
deleting documents associated with the user that are located on the plurality of user devices and that are on persistent disk storage and a metadata store; and
terminating active user sessions.

14. The system of claim 7, wherein the causing the targeted deletion comprises deletion of a selected one of the one or more documents associated with the user.

15. The system of claim 7, wherein the causing the targeted deletion comprises overwriting memory locations where a selected one of the one or more documents are stored.

16. The system of claim 7, wherein the causing the targeted deletion comprises denial of a request to access the one or more documents.

17. A computer-implemented method comprising:
identifying a plurality of user devices associated with a user of a document management and collaboration system on which the user has had a user session;
determining that one or more documents associated with the user that were downloaded to the plurality of user devices from the document management and collaboration system should be deleted from the plurality of user devices;
causing a targeted deletion of the one or more documents from the plurality of user devices; and
receiving, from the plurality of user devices, indications of successful deletion of the one or more documents.

18. The computer-implemented method of claim 17, wherein the plurality of user devices are identified based on hardware or software configuration information for the plurality of user devices.

19. The computer-implemented method of claim 17, further comprising:
receiving a request to download one of the one or more documents to one of the plurality of user devices;
sending an indication to a synchronization client of a location for document storage; and
receiving a message from the synchronization client indicating successful storage of the one of the one or more documents at the location.

20. The computer-implemented method of claim 19, further comprising:
in response to receiving the message, causing a database to indicate that the one of the one or more documents is downloaded or present on the one of the plurality of user devices.

21. The computer-implemented method of claim 17, wherein the causing the targeted deletion comprises sending push notifications to the plurality of user devices indicating that the one or more documents should be deleted from the plurality of user devices.

22. The computer-implemented method of claim 17, wherein the causing the targeted deletion comprises overwriting memory locations where a selected one of the one or more documents are stored.

* * * * *